United States Patent [19]

Shiba et al.

[11] Patent Number: 5,077,625
[45] Date of Patent: Dec. 31, 1991

[54] CARTRIDGE HAVING CASING WITH SHUTTER MOVABLE TO RECEIVE DISCS THEREIN

[75] Inventors: Haruo Shiba; Masaru Ikebe, both of Nagano, Japan

[73] Assignee: TDK Corporation, Japan

[21] Appl. No.: 682,688

[22] Filed: Apr. 9, 1991

Related U.S. Application Data

[63] Continuation of Ser. No. 261,030, Oct. 21, 1988, abandoned.

[30] Foreign Application Priority Data

Oct. 27, 1987 [JP]  Japan ................................ 62-163058

[51] Int. Cl.⁵ ............................................ G11B 23/03
[52] U.S. Cl. ..................................... 360/133; 369/291
[58] Field of Search ................ 360/133, 135; 206/444; 369/289, 291

[56] References Cited

U.S. PATENT DOCUMENTS

| | | | |
|---|---|---|---|
| 4,648,001 | 3/1987 | Komatsu et al. | 360/133 |
| 4,665,457 | 5/1987 | Odawara et al. | 360/133 |
| 4,794,480 | 12/1988 | Jones et al. | 360/133 |
| 4,805,061 | 2/1989 | Champagne et al. | 360/133 |
| 4,811,151 | 3/1989 | Kanazawa et al. | 360/133 |
| 4,858,050 | 8/1989 | Ashe et al. | 360/133 |
| 4,945,530 | 7/1990 | Sandell et al. | 360/133 X |

*Primary Examiner*—David J. Severin
*Attorney, Agent, or Firm*—Steinberg & Raskin

[57] ABSTRACT

A disc cartridge capable of causing movement of a pickup of a cartridge operating unit with respect to the cartridge and a disc to be simplified to efficiently operate the disc with high reliability and accuracy, enlarging a pickup moving area and ensuring free or desired layout of a pickup. In the disc cartridge, a front wall of a casing defining a pickup inserting hole and a slider are formed with first and second thin-walled sections each having the substantially same level as a surface of the disc, so that a pickup moving area may be enlarged sufficiently to permit only horizontal movement of the pickup to be required.

6 Claims, 8 Drawing Sheets

CARTRIDGE HAVING CASING WITH SHUTTER MOVABLE TO RECEIVE DISCS THEREIN

This is a continuation of application Ser. No. 07/261,030, filed Oct. 21, 1988, now abandoned.

BACKGROUND OF THE INVENTION

1. Field of the Invention

This invention relates to a disc cartridge, and more particularly to a disc cartridge in which a disc medium such as an optical disc, a photo-magnetic disc, a magnetic disc, a floppy disc or the like is rotatably received.

2. Description of the Prior Art

In general, a disc cartridge such as a tray system or a cartridge system using a casing has been conventionally employed for protecting a floppy disc, a compact disc, a video disc or the like which is used for a digital-data storing unit, a video unit or the like from damage and dust to ensure its safety.

Figure 1:
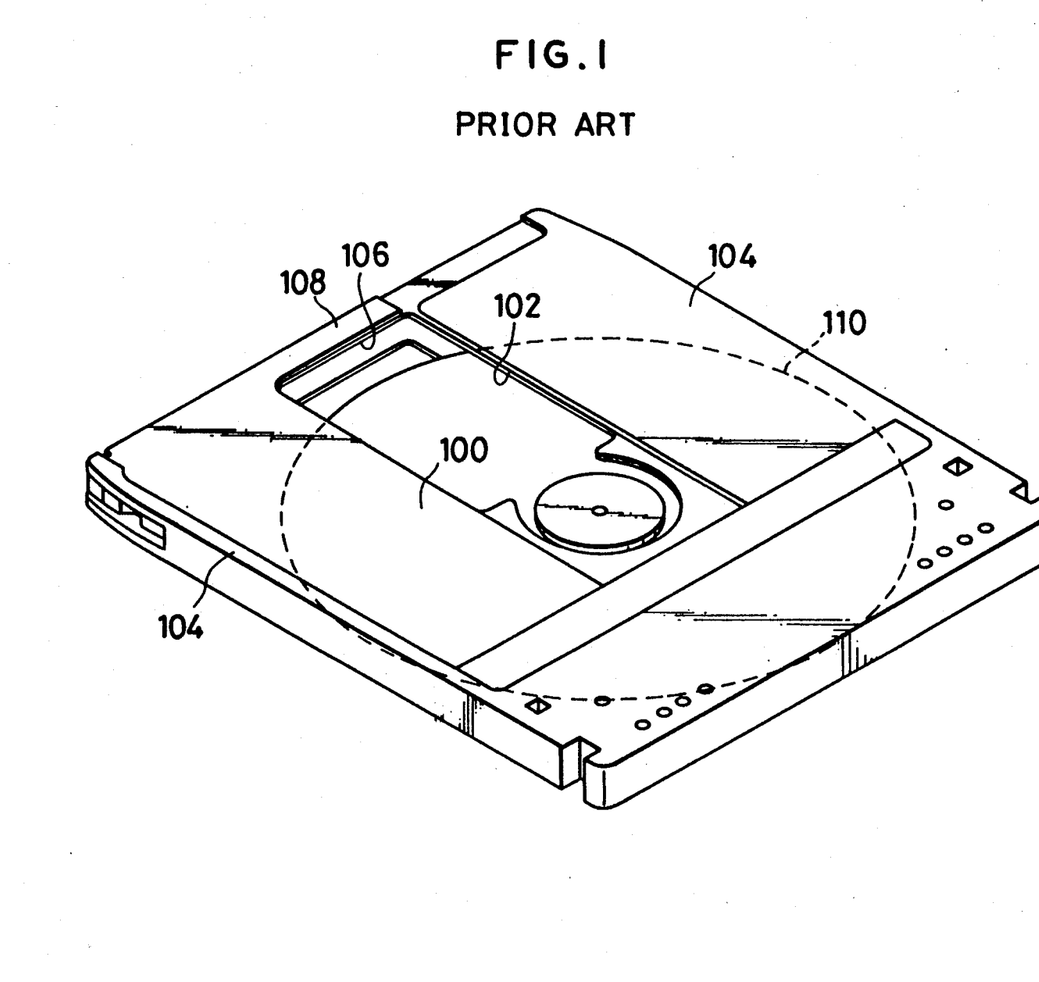
FIG. 1 is a perspective view showing a conventional disc cartridge.
Figure 2:
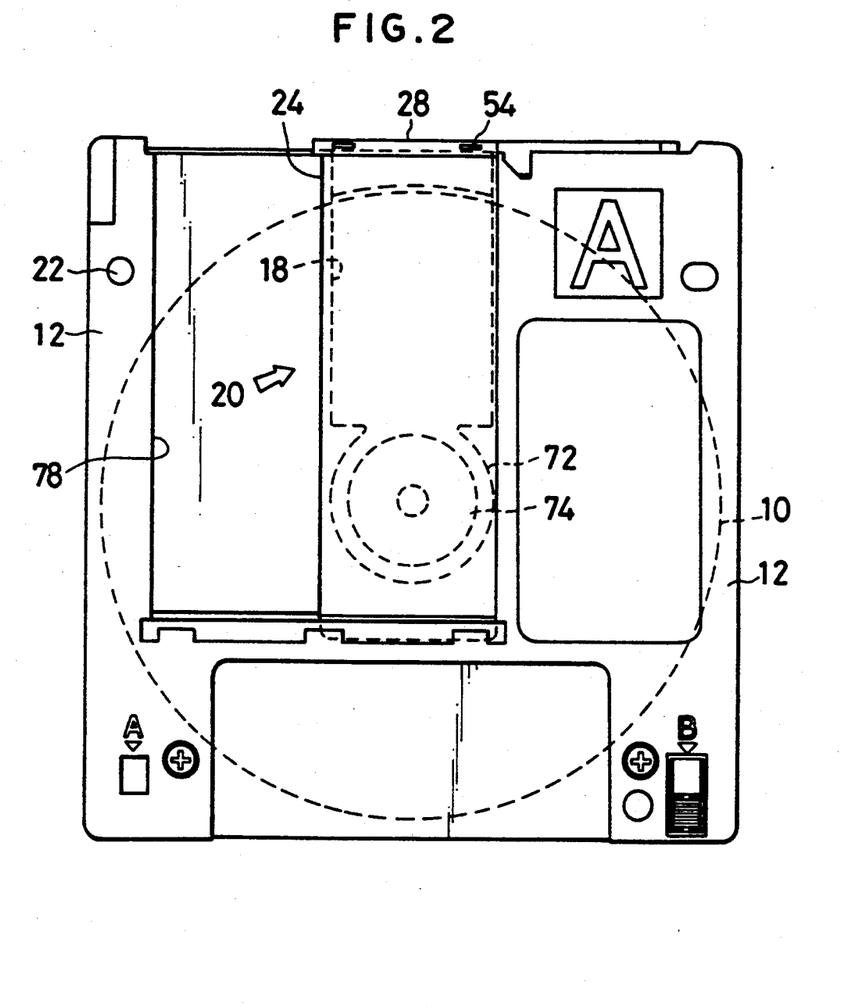
FIG. 2 is a plan view showing an embodiment of a disc cartridge according to the present invention.

For this purpose, the conventional disc cartridge, as shown in FIG. 1, is provided with a slidable shutter 100 which is adapted to close a pickup inserting hole 102 of a rectangular shape and/or a drive pin inserting hole of a casing 104 in nonuse and open the holes in use.

Unfortunately, in the conventional disc cartridge, in order to properly position a pickup of a disc cartridge operating unit such as a recording and/or reproducing unit (hereinafter referred to as "cartridge operating unit") on a disc 110 by operating the shutter to open the pickup inserting hole 102 to insert it through the hole 102 into the casing 104, the pickup is required to be first horizontally moved and then downwardly moved, because the casing 104 and shutter 100 are provided with front end walls 106 and 108, respectively. Thus, the conventional disc cartridge causes movement of the pickup to be complicated, resulting in not only proper positioning of the pickup on the disc being highly difficult to achieve but free or desired layout of the pickup being prevented. Also, this causes a pickup moving area or an area in which the pickup can move with respect to the casing to be substantially reduced, so that it is required to substantially enlarge the casing as compared with a size of the disc in order to enlarge the pickup moving area to a degree sufficient to permit the pickup to carry out a satisfactory operation with respect to an outermost section of the disc.

Accordingly, it would be highly desirable to develop a disc cartridge which is capable of enlarging a pickup moving area to a degree sufficient to permit a pickup of a cartridge operating unit to be smoothly inserted into a casing by simple movement and operate a disc over a wide area, ensuring desired layout of the pickup, as well as being compact and readily assembled to lead to a significant improvement in productivity of the cartridge.

SUMMARY OF THE INVENTION

Generally speaking, in accordance with the present invention, a disc cartridge is provided. The disc cartridge includes a casing comprising an upper casing member and a lower casing member joined together to define a space therein. The casing is formed with at least one pickup inserting hole through which a pickup of a cartridge operating unit is inserted into the casing and has a front wall arranged on an insertion side thereof through which the casing is inserted into the cartridge operating unit. The disc cartridge also includes a disc rotatably received in the casing and a shutter formed into a substantially U-shape and constituted by upper and lower shutter plates and a slider for connecting the upper and lower shutter plates to each other therethrough. The shutter is slidably mounted or fitted on the casing for operating the pickup inserting hole. The front end wall of the casing is formed at a portion thereof defining the pickup inserting hole with a first thin-walled section having a level substantially equal to or below a level of a surface of the disc.

In a preferred embodiment of the present invention, the slider of the shutter is formed with a second thin-walled section at a level substantially equal to or below the level of the disc at a portion thereof positionally corresponding to the first thin-walled section of the casing when the shutter is moved to open the pickup inserting hole. In a preferred embodiment of the present invention, the first thin-walled section of the front wall of the casing is provided by a cutout formed on at least one the upper and lower surfaces of the front wall. The first thin-walled section may be formed into a thickness substantially equal to or smaller than that of the disc.

In a preferred embodiment of the present invention, the second thin-walled section of the slider is provided by a cutout formed on at least one of upper and lower surfaces of the slider. The second thin-walled section may be formed into a thickness substantially equal to or smaller than that of the disc and provided at a portion of the slider other than a portion thereof on which the shutter plates are mounted.

Accordingly, it is an object of the present invention to provide a disc cartridge which is capable of enlarging a pickup moving area.

It is another object of the present invention to provide a disc cartridge which is capable of being significantly compacted.

It is a further object of the present invention to provide a disc cartridge which is capable of causing movement of a pickup of a cartridge operating unit with respect to the cartridge and a disc to be picked up said disc cartridge being simplified to operate the disc with high efficiency and accuracy.

It is still another object of the present invention to provide a disc cartridge which is capable of minimizing the size of a casing based on that of a disc.

It is yet another object of the present invention to provide a disc cartridge which is capable of ensuring free or desired layout of a pickup.

It is still a further object of the present invention to provide a disc cartridge which is capable of facilitating mounting of a shutter on a casing.

It is yet a further object of the present invention to provide a disc cartridge which is capable of substantially eliminating factors adversely affecting a disc and deteriorating aesthetic properties of the cartridge.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings; wherein.

DETAILED DESCRIPTION OF THE PREFERRED EMBODIMENT

Now, a disc cartridge according to the present invention will be described hereinafter with reference to the accompanying drawings.

The following description will be made in connection with an optical disc cartridge, however, the present invention is not limited to such an optical disc cartridge.

FIGS. 2 to 10 illustrate an optical disc cartridge which is an embodiment of a disc cartridge according to the present invention. An optical disc cartridge of the illustrated embodiment includes an optical disc 10 and a casing 12 for rotatably receiving the disc 10 therein. The casing 12 is constituted by an upper casing member 14 and a lower casing member 16 which are joined together to define a disc receiving space therein. The casing 12 is formed with at least one pickup inserting hole 18, through which a recording and/or reproducing pickup of a cartridge operating unit is inserted into the cartridge. In the illustrated embodiment, the pickup inserting hole 18 is formed at each of the upper and lower casing members 14 and 16.

Figure 5:
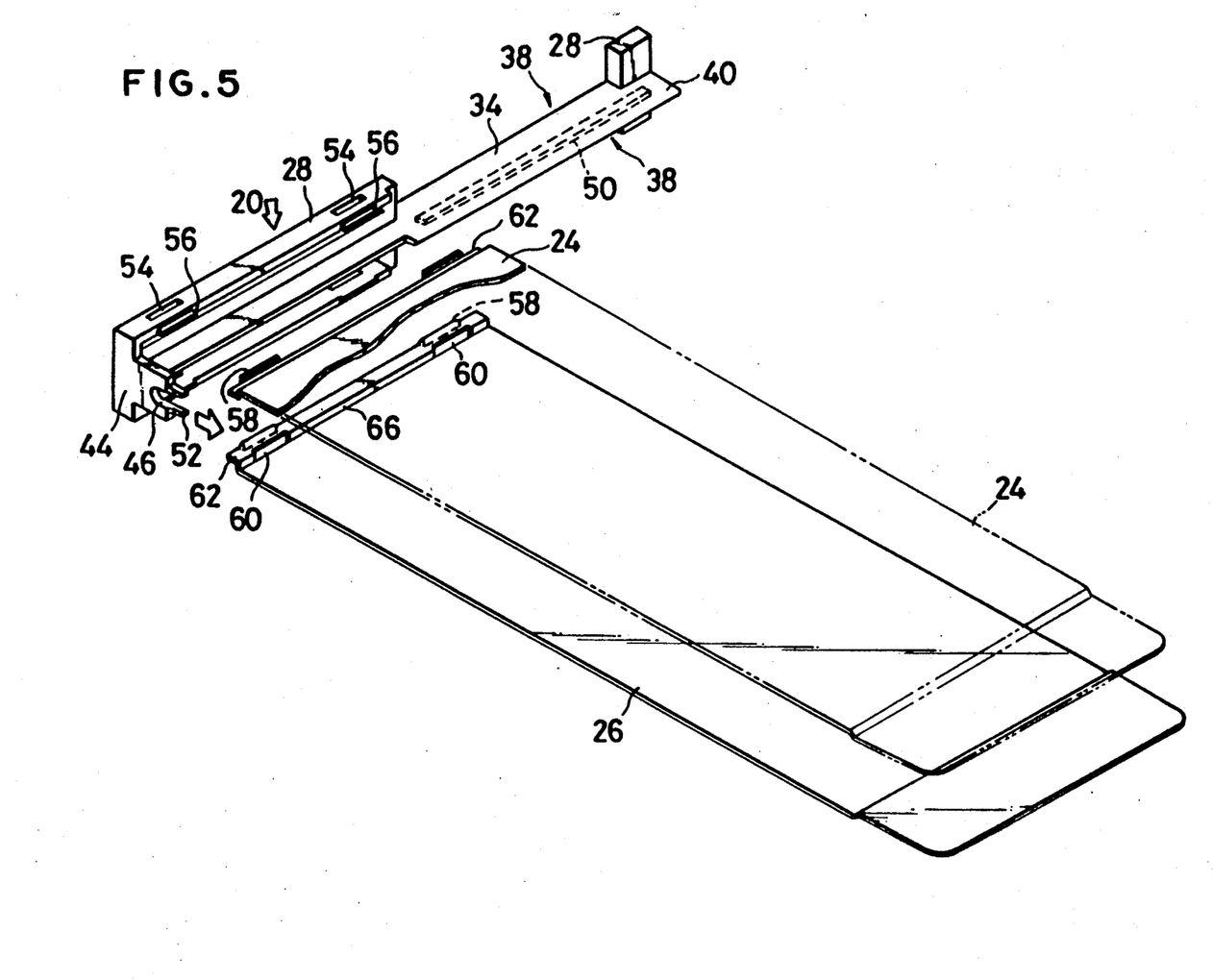
FIG. 5 is an exploded enlarged perspective view showing a shutter.
Figure 6:
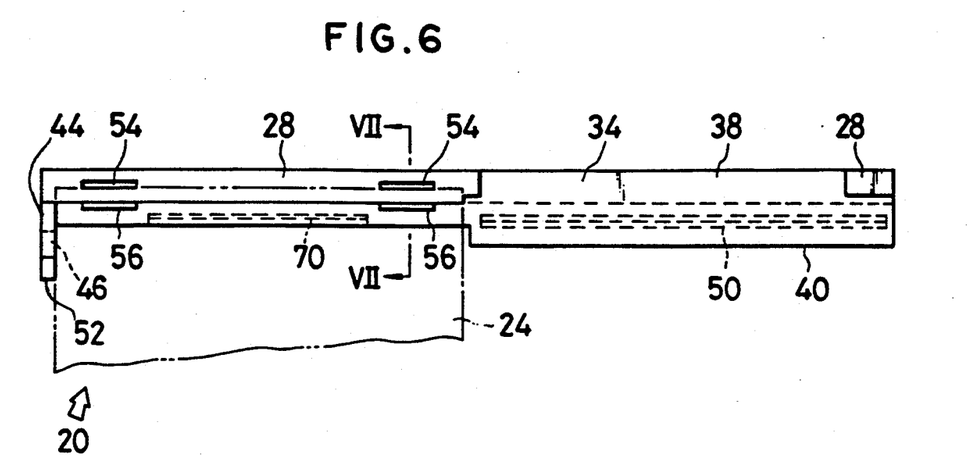
FIG. 6 is a plan view showing a slider of a shutter.
Figure 7:
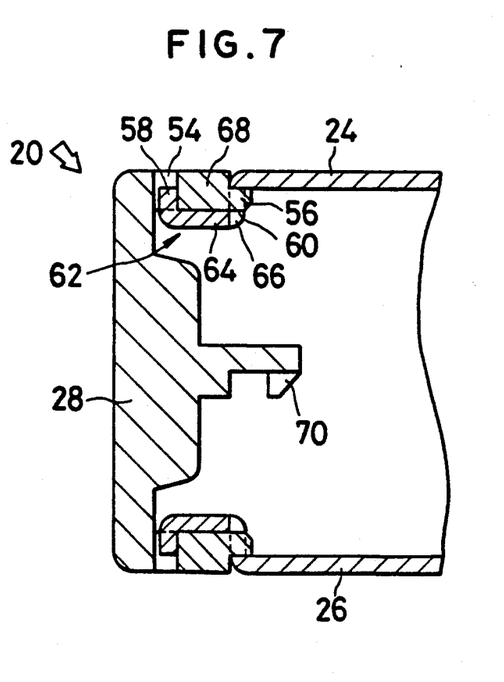
FIG. 7 is a sectional view taken along line VII—VII of FIG. 6.

The disc cartridge also includes a shutter 20 operated for opening and closing the pickup inserting holes 18 and a pin inserting hole 22 of the casing 12 while interposing upper and lower surfaces of the casing 12 therebetween. For this purpose, the shutter 20 is formed into a substantially U-shape. More particularly, the shutter 20 includes upper and lower shutter plates 24 and 26 and a slider 28 for connecting the upper and lower shutter plate members 24 and 26 to each other, as shown in FIGS. 5 and 7. Thus, the slider 28 acts as a side wall of the shutter 20 as well as provides the shutter 20 with a sliding function. The upper and lower shutter plates 24 and 26 may be made of stainless steel such as SUS 304 and the slider 28 is preferably formed of a lubricous material such as polyacetal.

Figure 4:
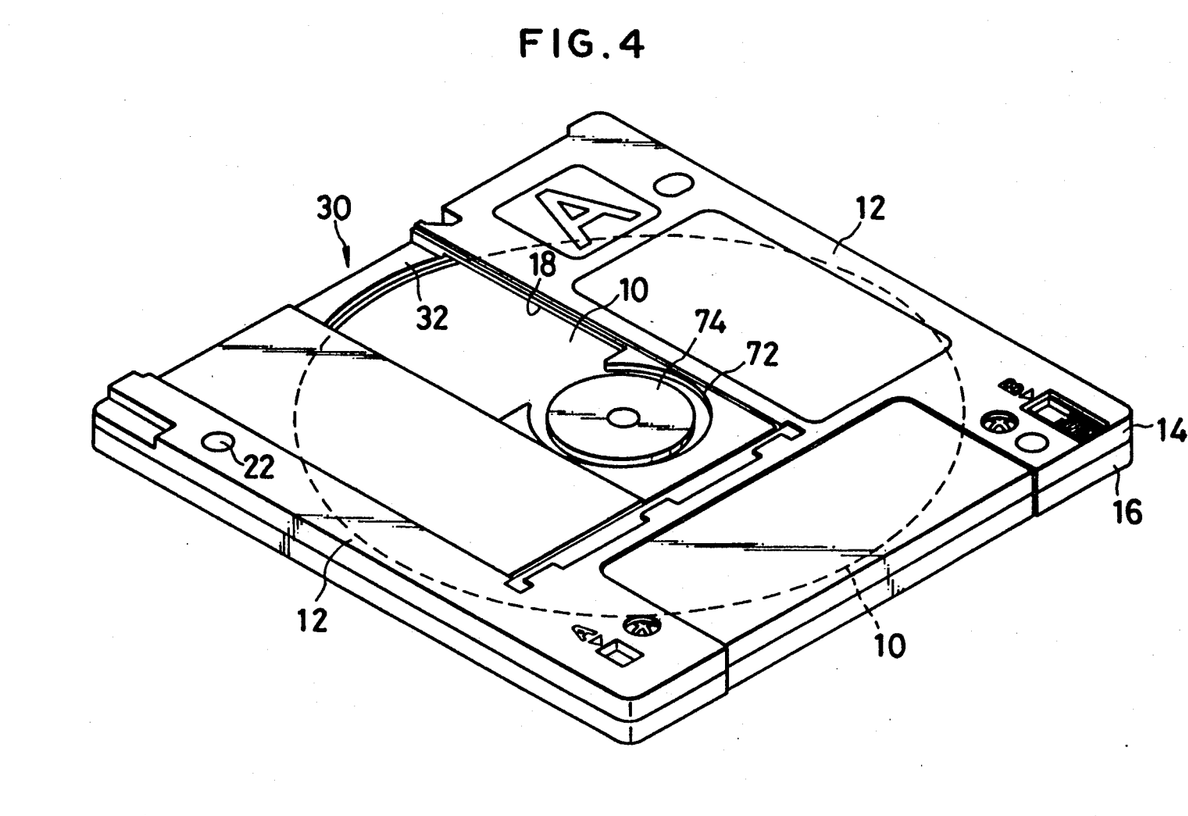
FIG. 4 is a perspective view of the disc cartridge shown in FIG. 2 wherein a shutter is removed therefrom.
Figure 10:
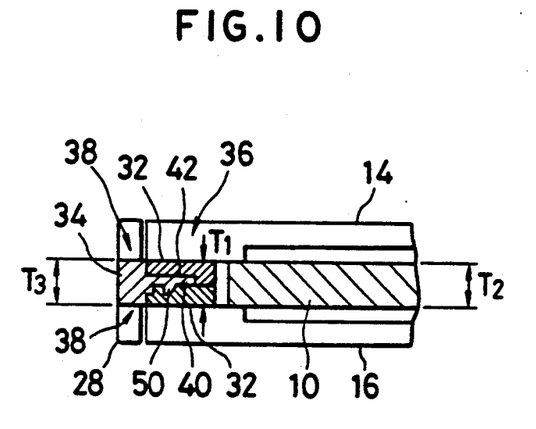
FIG. 10 is a fragmentary enlarged vertical sectional view taken along line X—X of FIG. 9.

One of the features of the disc cartridge of the illustrated embodiment generally constructed as described above is that an insertion side wall 30 of the casing 12, namely, a front wall of the casing 12 positioned on an insertion side of the casing through which the casing is inserted into a cartridge operating unit is formed at a portion thereof defining each of the pickup inserting holes 18 into a first thin-walled section 32 having a level substantially equal to or below a level of a surface of the disc 10, as shown in FIGS. 4 and 10. It is preferable that the slider 28 of the shutter 20 which is slidably moved on the front wall 30 of the casing 12 is likewise formed into a second thin-walled section 34 of a level substantially equal to or below the level of the disc at a portion thereof positionally corresponding to the first thin-walled section of the casing when the shutter is moved to open the pickup inserting holes 18, as shown in FIGS. 5 and 10. More particularly, in the illustrated embodiment, as shown in FIG. 10, the portion of the front wall 30 of the casing 12 is formed into a thickness T1 substantially equal to or smaller than a thickness T2 of the disc 10, to thereby provide the first thin-walled section 32, and the portion of the slider 28 is formed into a thickness T3 substantially equal to or smaller than the thickness T2 of the disc 10, resulting in the second thin-walled section 34. In the illustrated embodiment, the first thin-walled section 32 is constructed by forming cutouts 36 of a width substantially, equal to a stroke width of the shutter 20 on both upper and lower surfaces of the front wall 30 of the casing 12. The second thin-walled section 34 may be constructed by forming cutouts 38 on upper and lower surfaces of a portion of the slider 28 except a portion thereof connected to the upper and lower shutter plates 24 and 26 of the shutter 20.

The second thin-walled section 34 may be formed in a manner to horizontally inwardly extend, to thereby provide a rib-like guide 40, which is slidably fitted in a guide groove 42 (FIG. 10) provided at a portion of the casing 12 on the insertion side based on, e.g. positioned on the pickup inserting hole 18. In the embodiment, the guide groove 42 is formed on an inner surface of the casing 12.

Figure 8:
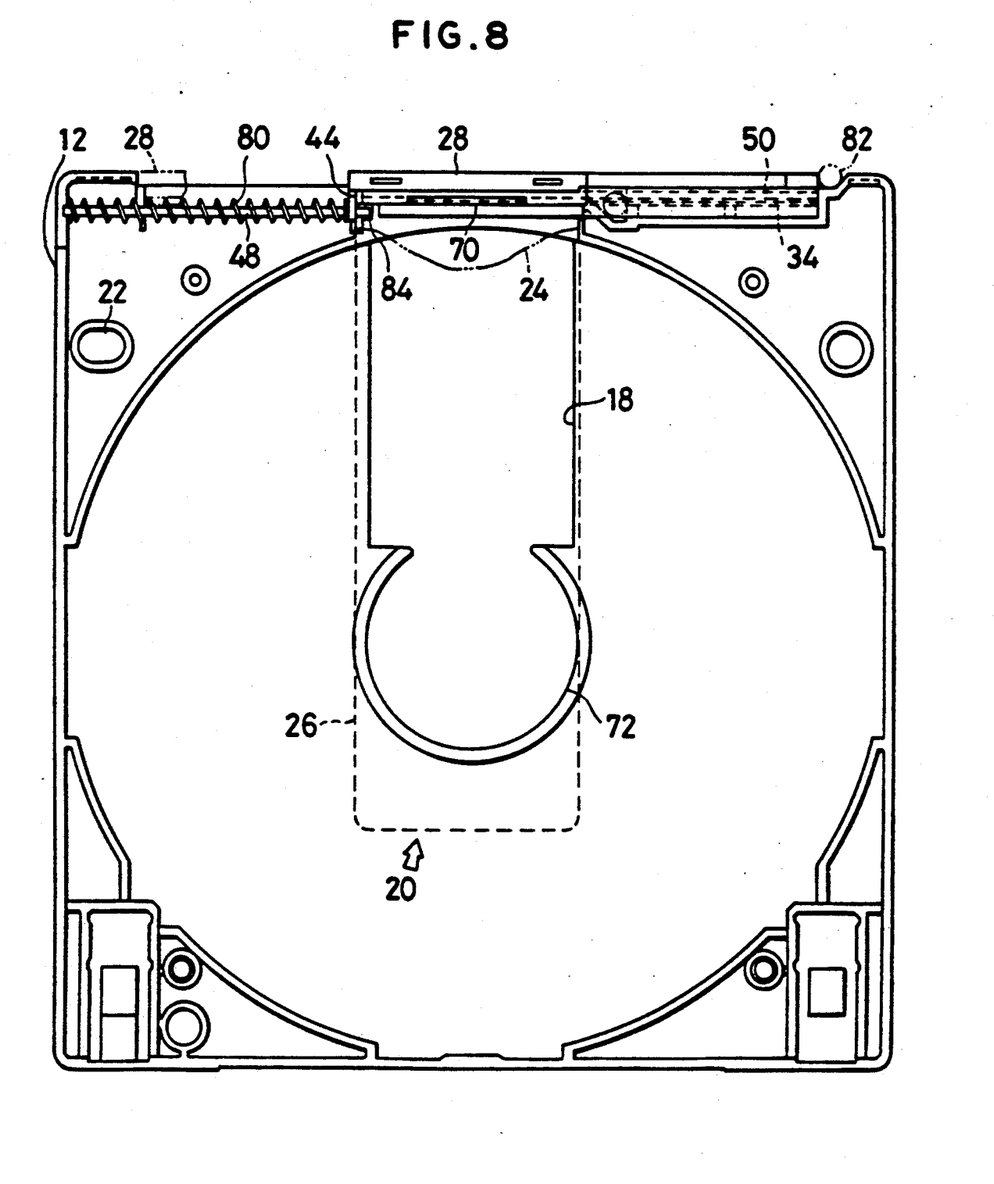
FIG. 8 is a plan view showing a lower casing member on which a shutter is mounted.
Figure 9:
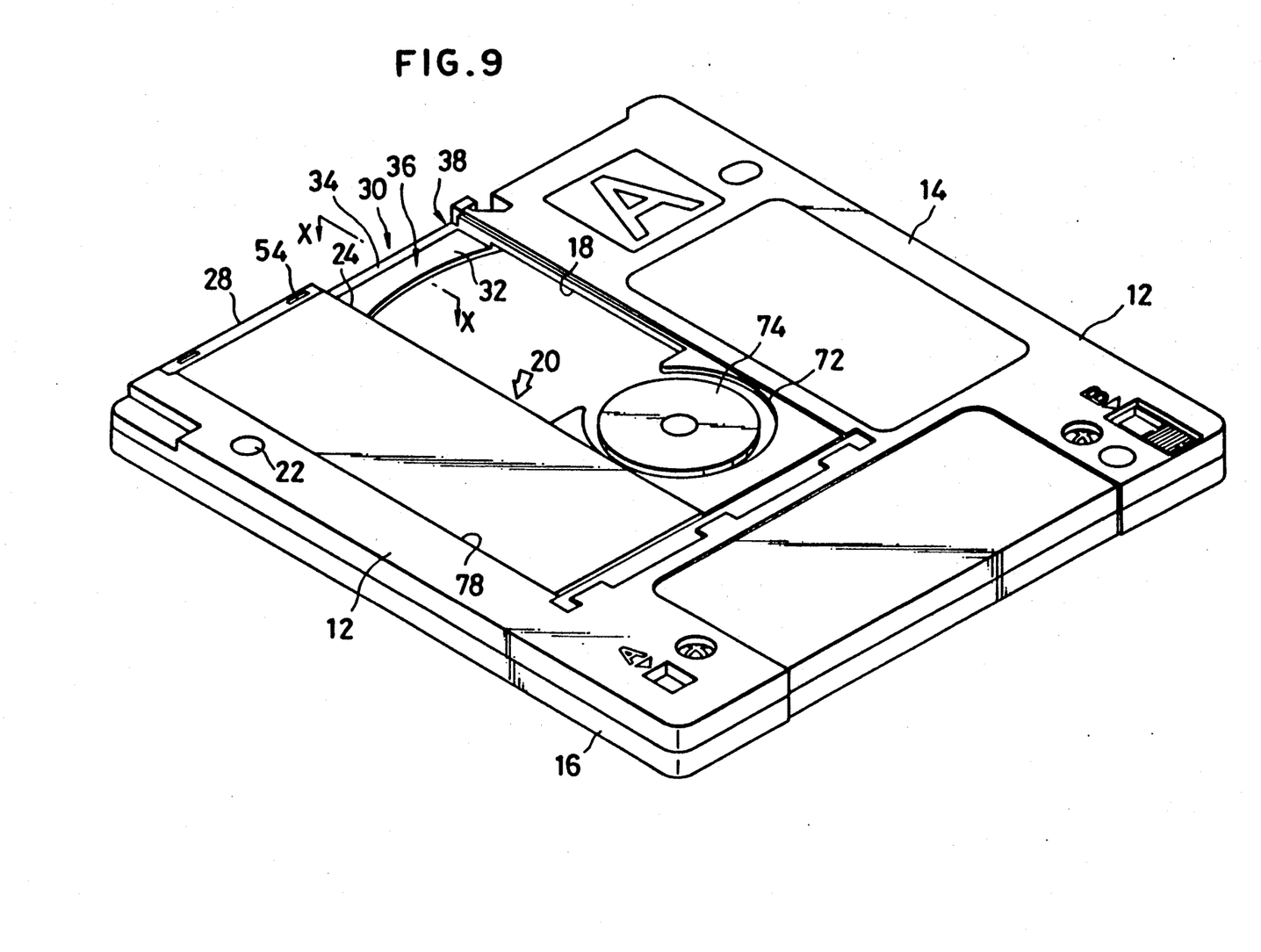
FIG. 9 is a perspective view of the disc cartridge shown in FIG. 2 wherein a shutter is moved to open a pickup inserting hole.

The shutter 20 includes a side wall 44 arranged on a side thereof opposite to the second thin-walled section 32 and formed with a support hole 46, as shown in FIG. 5, in which a shaft 48 (FIGS. 2 and 8) is fitted so that the slider 28 may be slidably guided on the shaft 48, as shown in FIG. 8. Also, the slider 28 is provided on the other side thereof opposite to the side wall 44 with a horizontally extending guide projection 50, which is engagedly fitted in the guide groove 42 of the casing 12. The guide projection 50 is provided on the second thinwall section 34.

The support hole 46 of the side wall 44 of the slider 28 is opened sideways. More specifically, in the illustrated embodiment, it takes the form of an elongated cutout of which a free end or rear end 52 is opened sideways, so that the end 52 of the side wall 44 is bifurcated through the cutout 46. The guide projection 50 is positioned on a central axis of the support hole 46. Such arrangement of the projection 50 effectively prevents it from projecting to a position in proximity to an upper or lower surface of the slider 28.

The slider 28 is provided on each of upper and lower sides of a portion thereof covered with the shutter plates 24 and 26 with each pair of holes 54 and projections 56 for engagement and correspondingly each of the upper and lower shutter plates 24 and 26 is provided with each pair of projections 58 and holes 60, which are respectively engaged with the holes 54 and projections 58, resulting in the shutter plates 24 and 26 being connected to the slider 20. The projections 58 and holes 60 of each shutter plate are arranged at a stepped connection section 62 of each shutter plate which is connected to the slider 28 and formed into a substantially L-shape. More particularly, as shown in FIG. 7, the projections 58 are upwardly arranged at a distal end of a horizontal section 64 of the stepped connection section 62 and the holes 60 are arranged at a vertical section 66 of the stepped connection section 62. The holes 54 and projections 56 are arranged at each of connection sections 68 of the slider 28 which are arranged in a manner to horizontally inwardly project from both upper and lower ends of the slider 28 and connected to the upper and lower shutter plates 24 and 26. More particularly, the holes 54 each are provided at a horizontal portion of the connection section 68 in proximity to the slider 28 and the projections 56 are provided at an end surface of the connection section 68. The connection between the slider 28 and each of the shutter plates 24 and 26, as shown in FIG. 7, is carried out by fitting the projections 56 of the slider 28 in the holes 60 of the shutter plate and fitting the projections 58 of the shutter plate in the holes 54 of the slider 28 while abutting an inner surface of the horizontal portion of the connection section 68 of the slider 28 against the horizontal section 64 of the stepped connection section 62 and abutting the end surface of the connection section 68 against the vertical portion 66 of the stepped connection section 62.

Figure 3:
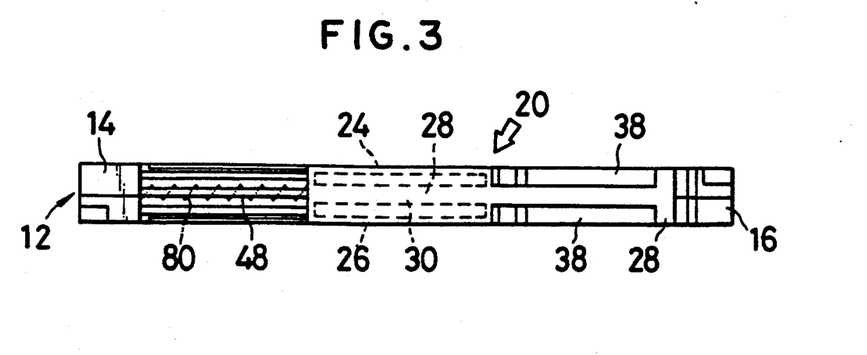
FIG. 3 is a front elevation view of the disc cartridge shown in FIG. 2.

The slider 28 may be provided with a projection 70 which is slidably fitted in the guide groove 42 of the casing 12, to thereby cause the slider 28 to be slidably moved with respect to the casing 12. Also, the casing 12 is formed at a central portion thereof with circular openings 72, in which hubs 50 of the disc 10 are received, as shown in FIG. 4. Further, the casing 12 is formed with recesses 78 for slidably receiving the shutter 20 therein in addition to the pickup inserting holes 18 described above. The shutter 20 is constantly urged in a direction of closing the pickup inserting holes 18 by a return spring 80 wound on the shaft 48 as shown in FIGS. 3 and 8. Thus, the pickup inserting holes 18 are kept covered with the shutter 20 in nonuse of the disc cartridge; whereas when the disc cartridge is loaded in a cartridge operating unit, the shutter 20 is slid on the shaft 48 through engagement between a shutter operating pin 82 of the unit and the slider 28 in a direction of opening the holes 18 against the return spring 80, resulting in the holes 18 being opened. When the cartridge is drawn out from the unit, the return spring 80 moves the shutter to the original position to close the holes 18.

Reference numeral 84 (FIG. 8) designates a shaft holding groove provided on the inner surface of the casing 12.

In the disc cartridge of the illustrated embodiment constructed as described above, only the side wall 44 of the slider 28 is moved in a pickup moving area in which a pickup of a cartridge operating unit is moved with respect to the disc cartridge. Also, the side wall 44 is moved away from the pickup moving area by the shutter operating pin 82 of the unit and kept apart from the area when the disc cartridge is inserted in the unit. Accordingly, such construction effectively prevents the disc cartridge from interfering with movement of the pickup with respect to the disc cartridge. More particularly, the front wall 30 of the casing 12 and the slider 28 are placed on the substantially the same level as the disc by the presences of the first and second thinwalled sections 32 and 34 when the shutter is moved to open the pickup inserting hole 18, so that the pickup is merely required to be horizontally moved. This means that the embodiment ensures smooth and proper operation of the pickup on an outermost periphery of the disc as well as its remaining portion.

Thus, it will be noted that the disc cartridge of the present invention exhibits the advantages of causing movement of a pickup of a cartridge operating unit with respect to the cartridge and the disc to be simplified to efficiently operate the disc with high reliability and accuracy, increasing a pickup moving area and ensuring free or desired layout of the pickup, as well as minimizing a size of the casing based on that of the disc and facilitating mounting of the shutter on the casing.

It will thus be been that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. A disc cartridge comprising:
   a casing comprising an upper casing member and a lower casing member joined together to define a space therein, said casing being formed with at least one pickup inserting hole;
   a disc mounted in said casing so as to be rotatably movable therein;
   a shutter which is substantially U-shaped an comprises an upper shutter plate, a lower shutter plate and a slider, said upper shutter plate, said lower shutter plate, and said slider each having respective mating projections and holes such that said upper shutter plate is connected to said slider and said lower shutter plate is connected to said slider;
   said shutter having a guide projecting which engages with a guide groove of said casing such that said shutter is slidably movable relative to said casing to cover and uncover said pickup hole;
   a wall of said casing having a portion thereof defining said pickup hole and, at said portion, being formed to be therein thinner than at its other portions and to be at a level substantially equal to or below the level of the plane of said disc, said guide groove being positioned on said portion of said wall; and
   wherein said slider of said shutter comprises a thin walled section at a level substantially equal to or below said level of said disc at a portion thereof positionally corresponding to said thinner portion of said wall casing when said shutter is moved to uncover said pickup inserting hole, said guide projection being provided on said thin-walled section.

2. The disc cartridge of claim 1, wherein said wall includes an upper and lower surface, and said thinner portion of said wall of said casing is formed by cutout made in both the upper and lower surfaces of said wall.

3. The disc cartridge of claim 1, wherein said thinner portion of said wall of said casing has a thickness equal to or smaller than that of said disc.

4. The disc cartridge of claim 1, wherein said thin-walled section of said slider has a thickness equal to or smaller than that of said disc.

5. The disc cartridge of claim 1, wherein said thin-walled section of said slider is located at a portion of said slider remote from said mating projections and holes of said slider.

6. The disc cartridge of claim 1, wherein said thin-walled section of said slider is formed by a cutout on at least one of the upper and lower surfaces of said slider.

* * * * *